March 27, 1928.
F. H. CHAPMAN
WEIGHING SCALE
Filed Oct. 5, 1925
1,663,973
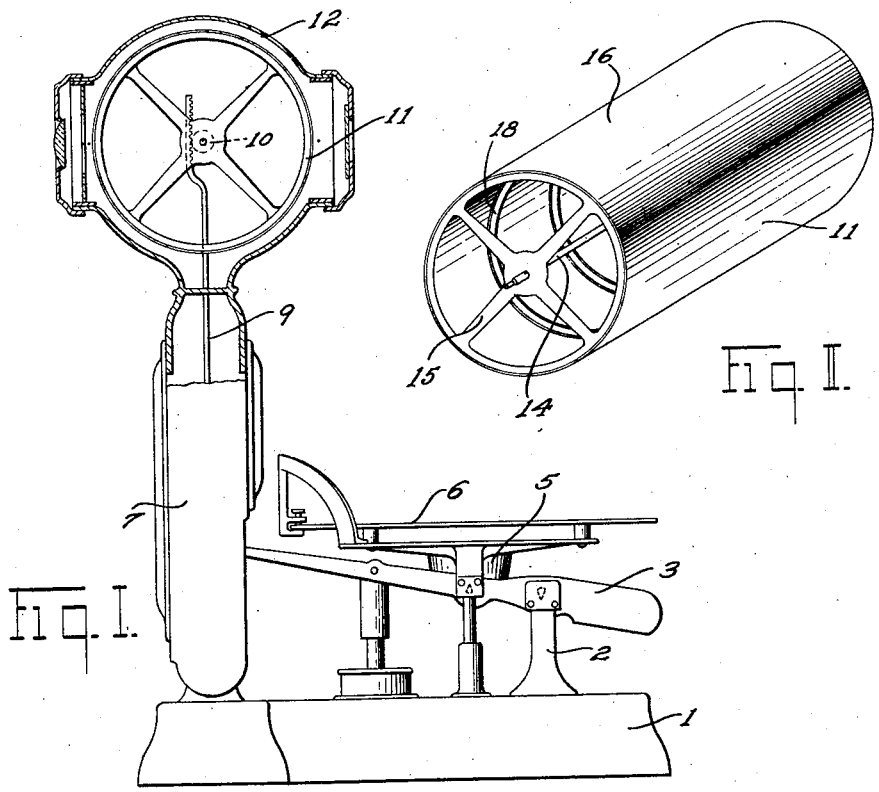
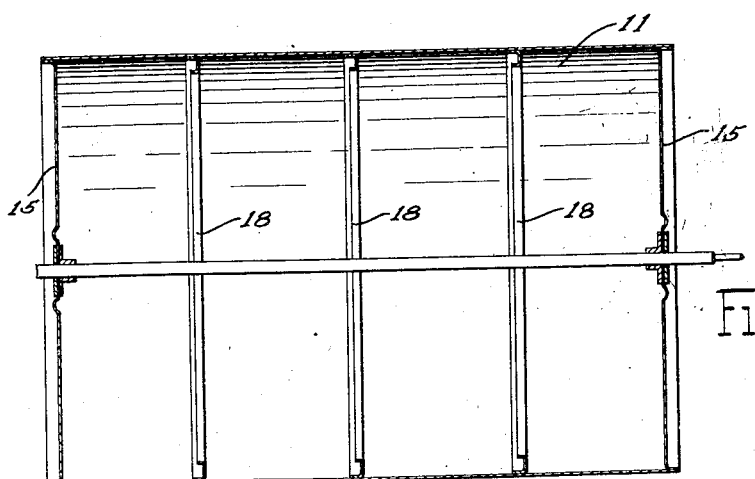
Inventor
Frank H. Chapman.
By C.D. Marshall
Attorney Patented Mar. 27, 1928.

1,663,973

UNITED STATES PATENT OFFICE.

FRANK H. CHAPMAN, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed October 5, 1925. Serial No. 60,385.

This invention relates to weighing scales, and more particularly to the weight indicating and price computing charts for scales.

In the manufacture of weighing scales of the counter type, more commonly known as computing cylinder scales, it is the common practice to print the weight indicia and price computations upon comparatively long sheets of paper which are subsequently rolled into cylindrical form, the ends overlapped and secured together by glue or other suitable substance and thin sheet metal spiders slipped into the cylinder of paper to maintain the cylindrical form and to mount the chart upon a shaft so that the same may be operated by the weighing mechanism of a scale. The practice now is to put three spiders into the chart, one at each end and one in the middle. It has, however, been found that due to the natural tendency of the paper to shrink due to unfavorable weather conditions, the portions of the paper between the supporting spiders are caused to sag, thus making the external cylindrical surface of the charts irregular, and in many cases the sag is sufficient to cause the operator of the scale to obtain an erroneous reading, and in scales where a comparatively powerful magnifying lens is employed to magnify the computations the sag is great enough to bring the surface of the chart out of proper focus with the lens and cause a noticeable distortion of the figures and computations. In most of the States laws exist which require that the surface of the chart co-operating with the index or reading wire must never exceed a very small fraction of an inch from the index. In some cases the sag between the chart spiders is sufficiently great to exceed the limits provided by law.

One of the principal objects of this invention is the provision of a weighing scale chart of the cylindrical type having a plurality of spaced reinforcing members to prevent the sag in the chart.

Another object of the invention is the provision of a reinforcing means for a weighing scale chart which is extremely light in weight so that no material increase in the weight of the chart is made which would tend to set up additional friction in the chart supporting bearings.

Still a further object is the provision of a reinforcing means for cylinder scale charts which prevents excessive shrinkage of the chart paper so that the exterior surface will remain substantially parallel with the longitudinal axis of the chart.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a side elevational view of a weighing scale embodying my invention, parts thereof being shown in section;

Figure II is an isometric perspective view of the chart; and

Figure III is an enlarged sectional detail view through the chart showing the reinforcing means of my invention.

Referring to the drawings in detail, I have illustrated my invention as incorporated in an automatic weighing scale of the counter type, and as the scale per se forms no part of my present invention I will describe it only in such detail as to show the application of my device thereto.

The scale comprises a base 1 having a base horn or fulcrum stand 2 mounted upon one end thereof and which pivotally supports a main lever 3, the latter being provided with suitable load pivots supporting a spider 5 surmounted by a commodity receiving platform 6. The nose end of the lever 3 projects into a housing 7 erected upon the other end of the base 1 and is operatively connected to a suitable load-counterbalancing mechanism (not shown) supported within the housing 7. The lever 3 is also connected by rack 9 and pinion 10 to a weight indicating and price computing chart 11 which is preferably supported upon anti-friction bearings mounted in a substantially cylindrical casing 12 surmounting the housing 7.

The chart 11 consists of a shaft 14 upon which is mounted a pair of spaced spiders 15 preferably constructed of thin sheet metal, and a sheet of paper or cardboard 16 usually of about the thickness of two-ply bristol board surrounds and is fixedly secured to the peripheries of the spiders 15, the exterior surface of the paper 16 bearing a series of weight graduations and price computations (not shown). The paper 16 is preferably lacquered on both sides to preserve it and keep it from absorbing moisture. Manufacturers of weighing scale charts have employed practically every known means to make the chart paper impervious to moisture, and yet the chart paper shrinks, resulting in considerable sag in the chart between the spiders.

I have provided novel means for obviating this difficulty without materially increasing the weight of the chart by the insertion in the cylindrical form of the chart of a plurality of annuli or rings 18, the rings being extremely light in construction and preferably of channeled form, as particularly illustrated in Figure III, to provide the necessary strength and rigidity to prevent warping or buckling. It will be apparent that with several of these rings inserted in the chart and equally spaced the periphery of the chart will be at all times and under all weather conditions maintained in substantially perfect form. The rings may be secured to the chart paper in any suitable manner, as, for example, by gluing or shellacing. The rings 18 are constructed of extremely thin sheet metal so that no appreciable weight is added to the chart which would set up friction in the scale.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a chart comprising a sheet of material formed into a cylinder, a supporting spider secured to each end of said cylinder, and means for reinforcing said chart including a plurality of rings interposed between said spiders, the peripheries of the rings engaging the interior surface of the chart to prevent excessive shrinkage or buckling, said rings being irregular in cross section to increase the strength and rigidity thereof.

2. In a device of the class described, in combination, a chart comprising a sheet of material formed into a cylinder, supporting spiders secured to said cylinder, and means for reinforcing said chart including a plurality of rings interposed between the spiders in said cylinder, said reinforcing rings having annular flanges to increase the strength and rigidity thereof.

3. In a device of the class described, in combination, a chart comprising a sheet of material formed into a cylinder, supporting spiders secured to said cylinder, and means for reinforcing said chart including a ring interposed between the spiders in said cylinder, said reinforcing ring having annular flanges to increase the strength and rigidity thereof.

FRANK H. CHAPMAN.